May 30, 1933.  E. HEINZ  1,911,504
HEATING DEVICE ON COFFEE MACHINES AND SIMILAR BOILERS
Filed June 1, 1931
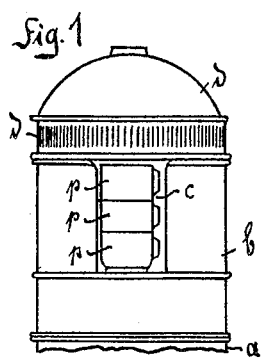
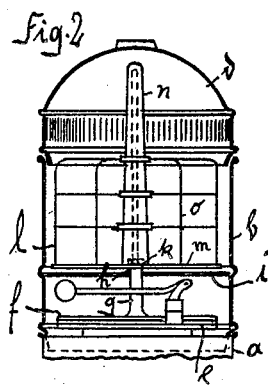
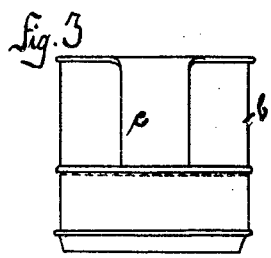
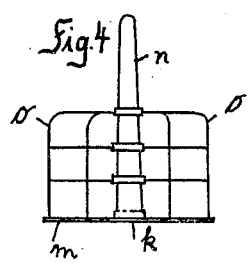
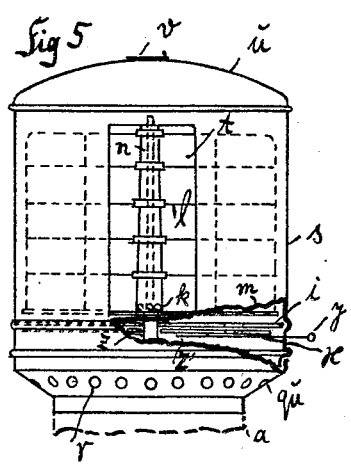
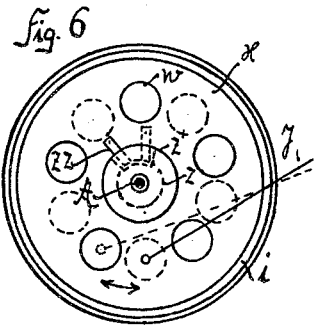

Patented May 30, 1933

1,911,504

UNITED STATES PATENT OFFICE

EDWIN HEINZ, OF JENA, GERMANY

HEATING DEVICE ON COFFEE MACHINES AND SIMILAR BOILERS

Application filed June 1, 1931, Serial No. 541,491, and in Germany February 7, 1930.

Coffee machines are known in several constructions, which, although they allow large quantities of coffee to be produced, possess the inconvenience that the cold cups etc., employed considerably cool the beverage which it is desired to serve hot, so that even rinsing the cups with hot water is not sufficient to overcome the complaint concerning cold cups.

In large establishments the rinsing of the cups further wastes too much time and cannot be carried out.

The heating cover is however open to great objection that, although for example it is possible to insert a plurality of small plates with vituals therein, it is impossible to remove first the plates or other articles, which were first inserted and have become hot. The articles, which were last inserted and which are mostly cold, must be first withdrawn from the cover.

However, the service with a coffee machine must be quick and the time wasting removal of the articles which have become too hot offers no advantages.

The present invention relates to a heating device on coffee machines and similar boilers, which overcomes the above mentioned objections and is characterized substantially in that on the casing of the coffee machine a top casing having a sieve-like bottom is inserted, in which a rotary frame is arranged in which for example cups and the like can be inserted for heating through one or more apertures in the top casing. The advantage obtained consists in that the cold cups can be inserted in each compartment of the rotary frame. A short time after insertion the cups or other desired articles coming from the other side, can be removed in well heated condition easily and without any detrimental effect by simply turning the rotary frame. The top casing is closed by a known cover.

The heating device can be quickly fitted to any coffee machine in that a vertical shaft, provided with a foot plate or the like or fixed by other means, is arranged on the cover of the boiler and carries a rotary frame, provided with ball bearings or the like and having a perforated bottom and subdivided by a trellis-work or the like or made entirely of wire. The frame proper is surrounded by a top casing mounted on the casing of the coffee machine and having for example a perforated bottom or the like for covering the boiler, and this top casing has one or more suitable apertures for inserting the articles to be heated, for example cups, glasses or the like, on to the rotary frame situated behind the apertures. A known closing cover is placed on the top casing and serves as cover for the complete coffee machine.

The rotary frame may however be arranged movable on rollers, wheels, balls, ball bearings or the like on a suitably shaped track, which is arranged on the casing of the coffee machine or on the boiler cover, if necessary by means of a detachable intermediate part. The movement of the rotary frame may be effected by hand, automatically, by means of levers or the like.

In order to meet all requirements, the top casing may be enlarged and contain a conical enlarged portion. The conical enlarged portion provided with perforations is also placed on the boiler. On this enlarged portion the enlarged top casing, provided with one or more apertures, is placed and has an intermediate plate, provided with a plurality of relatively large apertures. A shiftable bottom plate, if desired rotatable and having apertures registering with those in the intermediate plate, is so arranged on the intermediate plate that the holes in the intermediate plate and in the slidable plate more or less register as required. This may be effected by hand, by turning, or by shifting by means of a regulating bar or the like or automatically by a temperature regulator. The adjustability can, if desired, be limited by means of tongues or the like, in which case adjustment of the holes or slots is indicated on a scale on the outside by means of a hand. The rotatability of the slidable plate may be effected for example by fitting a circular plate on the intermediate plate. This serves for guiding the shiftable plate, and the circular plate is covered by a larger plate in order to afford support for the shiftable plate in downward direction. A section ring may also be employed. In the interior of the top casing, provided with one or more apertures, a rotary frame is arranged for accommodating the cups or the like to be heated.

The top casing is closed at the top with a cover, which may have an opening at the top, if desired, having an adjustment flap, disc or the like.

The shape, arrangement and material of the heating device and its individual parts may be varied as desired.

An embodiment of the invention is illustrated by way of example in the accompanying drawing in which:—

Fig. 1 shows the upper portion of the coffee machine in elevation.

Fig. 2 is a vertical section through the top casing and cover.

Fig. 3 shows the top casing in elevation.

Fig. 4 shows the wire frame in elevation.

Fig. 5 shows the coffee machine with widened top portion and widened intermediate casing partly broken away to show in section the intermediate and shiftable plates, the casing being shown in dotted lines.

Fig. 6 is a bottom plan view of the shiftable plate according to Fig. 5 with holes, tongues and adjusting bar shown in full lines, and in shifted position in dotted lines.

A top casing $b$ having an aperture $c$ is placed on the casing $a$ of the coffee machine (Fig. 1). The top casing $b$ is closed by a cover $d$. Inside the casing on the boiler lid $e$ of the coffee machine (Fig. 2) a flat plate $f$ is screwed, on which the vertical shaft $g$ is fixed, which is reduced at $h$. The shaft $g$ projects through the sieve-like perforated bottom $i$ of the top casing and forms at the offset portion $h$ a bearing for a ball bearing $k$ of a rotary frame $l$. The rotary frame $l$ has a perforated bottom $m$, on which in the centre a shaft sleeve $n$ is fixed accommodating in its interior the ball bearing $k$. On the shaft sleeve $n$ for example six wire frame partitions $o$ are arranged and fixed on the bottom $m$ so that the bottom is subdivided thereby into six uniform sections.

The wire frame partitions are so shaped and provided with intermediate wires that they form a support for the superposed cups $p$. The rotary frame $l$ with the partitions $o$ may be of any desired height and the top casing $b$ with the aperture $c$ is shaped accordingly.

In Fig. 5 a conical widened portion $u$ is placed on the casing $a$ of the coffee machine boiler, shown in dotted lines and provided with perforations $r$. The top casing $s$ rests on the widened portion $qu$. This top casing has an aperture $t$. The top casing $s$ is closed at the top by a cover $u$, which is provided with an aperture $v$ and, if desired, with an adjustable flap, slide or the like. In the top casing $s$ a shiftable plate $x$ provided with holes $w$ and rotatable with an intermediate plate $i$ is arranged so that, by shifting or pulling an adjustment rod $y$, the apertures of the intermediate plate and of the shifting plate can be caused to register more or less as required.

In order to permit the rotation of the shiftable plate, a circular plate $z$ is arranged for example on the intermediate plate $i$, and on same a supporting plate $z'$. The shiftable bottom plate turns between the intermediate and supporting plates and it is guided by the circular plate $z$. In order to limit the turning movement of the shiftable plate $x$ a tongue $z$, $z$ is arranged thereon, which can move within certain limits in a stamped out portion of the supporting plate $z'$. The shaft $g$, $h$, which carries the rotatable frame $l$, extends through a hole $A$ of the shiftable plate $x$ with its supporting plate $z'$ and guiding plate $z$ and also through the intermediate plate $i$.

The widened portion $qu$ allows a larger top casing $s$ to be used, which in turn accommodates a larger rotary frame $l$, which enables a larger number of cups or other articles to be heated by the existing heat, and this heat, which would otherwise be lost, is thus fully utilized. In order to prevent the cups and the like from becoming too hot during slack periods, the supply of the heat is regulated by the shiftable plate $x$, this regulation being effected either by hand or automatically and indicated on the outside by means of a hand. When the heat supply is partially or completely shut off, the heat escapes through the holes $r$ of the widened portion $qu$. The heat stored in the top casing $s$ can also be regulated by the upper aperture $v$ in the cover $u$.

The fitting together is very simple. After, for example in the case of coffee machines already in use, the flat plate $f$ is screwed on the boiler cover $e$ with the shaft $g$, the top casing $b$ with the perforated bottom plate $i$ is placed on the edge of the casing, the rotatable frame $l$ with its ball bearing $k$ is slipped on to the shaft $g$ and the cover $d$ placed on the top casing $b$. The desired number of cups are then placed through the aperture $c$ of the top casing $d$ on to the perforated bottom plate $m$ of the frame $l$ (Figs. 1 and 4) and, as soon as one compartment is full, this frame is turned and the next compartment filled and so on. As soon as the frame $l$ has been completely filled, the first cups inserted can be already removed sufficiently heated. The compartment, from which the cups have been removed, is then again filled and the frame turned and the heated cups in the next compartment can be removed and replaced by cold cups and so on.

The subdivision of the bottom of the frame depends upon its use. For example in the heating arrangement shown in the drawing, three times six cups, that is eighteen cups, can be continually heated and removed in any desired succession.

In Fig. 5 the widened portion $qu$ is placed on the casing $a$ of the coffee machine boiler and the top casing with the rotary frame $l$ on this casing $a$, the whole being covered at the top by the cover $u$.

I claim:

1. A heating device for coffee machines, comprising in combination with the plate cover and the casing of the coffee machine, a plate adapted to be fitted on said cover, a vertical shaft fixed on said plate, a rotatable frame slipped onto said shaft, a ball bearing guiding said frame on said shaft, a perforated bottom plate on said frame, a trellis work dividing said frame into a plurality of compartments, a top casing on said coffee machine casing enclosing the rotatable frame, a perforated intermediate plate in said top casing below said frame, said top casing having an aperture for inserting into and removing the articles from said frame, and a cover placed on the upper end of said top casing.

2. A heating device for coffee machines, comprising in combination with the plate cover and the casing of the coffee machine, a plate adapted to be fitted on said cover, a vertical shaft fixed on said plate, a rotatable frame slipped onto said shaft, a ball bearing guiding said frame on said shaft, a perforated bottom plate on said frame, a trellis work dividing said frame into a plurality of compartments, a top casing on said coffee machine casing enclosing the rotatable frame, a perforated bottom plate in said top casing over said coffee machine cover, said top casing having an aperture for inserting into and removing the articles from said frame, and a cover placed on the upper end of said top casing.

3. A heating device for coffee machines, comprising in combination with the plate cover and the casing of the coffee machine, a plate adapted to be fitted on said cover, a vertical shaft fixed on said plate, a rotatable skeleton frame slipped onto said shaft, a ball bearing guiding said frame on said shaft, a top casing on said coffee machine casing enclosing the rotatable frame, a perforated bottom plate in said top casing over said coffee machine cover, said top casing having an aperture for inserting into and removing the articles from said frame, and a cover placed on the upper end of said top casing.

4. A heating device for coffee machines, comprising in combination with the casing of the coffee machine, a frusto-conical perforated enlarged collar placed on said coffee machine casing, a top casing having an aperture placed on said enlarged collar an intermediate plate in said top casing having large apertures, a shiftable plate below said intermediate plate having apertures registering with the apertures in said intermediate plate, an adjusting rod to facilitate turning of said shiftable plate relative to said intermediate plate to cause the apertures in said shiftable plate to cover more or less the apertures in said intermediate plate, means for limiting the turning movement of said shiftable plate, a rotary frame in said top casing adapted to receive the articles to be heated, a cover on the top casing having an aperture in its top and means for adjusting the size of the aperture in the top of said cover.

5. In a heating device as specified in claim 1 in combination with the top casing, a shiftable plate beneath said intermediate plate, and a section ring beneath said intermediate plate adapted to guide said shiftable plate.

6. In a heating device as specified in claim 1, in combination with the top casing, a shiftable plate beneath said intermediate plate, a circular plate beneath said intermediate plate adapted to guide said shiftable plate and a supporting plate for said shiftable plate positioned beneath said circular and shiftable plates.

In testimony whereof I affix my signature.

EDWIN HEINZ.